United States Patent [19]

Sato

[11] Patent Number: 4,743,921
[45] Date of Patent: May 10, 1988

[54] INFORMATION SIGNAL REPRODUCING APPARATUS HAVING A TRACKING CONTROL SYSTEM

[75] Inventor: Junichi Sato, Kanagawa, Japan

[73] Assignee: Canon Kabushiki Kaisha, Japan

[21] Appl. No.: 864,017

[22] Filed: May 16, 1986

[30] Foreign Application Priority Data

May 22, 1985 [JP] Japan .................................. 60-108442
May 22, 1985 [JP] Japan .................................. 60-108443

[51] Int. Cl.⁴ ........................................... G01D 15/00
[52] U.S. Cl. ..................................... 346/74.2; 360/77
[58] Field of Search ................. 346/74.2; 360/77, 72.2, 360/10.2, 63, 67, 68, 72.1

[56] References Cited

PUBLICATIONS

U.S. Ser. No. 864,017, to Takayama, filed 5/16/86.

Primary Examiner—Arthur G. Evans
Attorney, Agent, or Firm—Toren, McGeady & Associates

[57] ABSTRACT

In an apparatus for reproducing, with a reproducing head, information signals from a recording medium on which many recording tracks are formed in parallel, the tracking action of the reproducing head on the recording tracks is controlled according to a first control signal generated on the basis of a signal reproduced by the reproducing head from one of the many tracks mainly under control and a second control signal generated on the basis of signals reproduced by the reproducing head from two tracks neighboring the track mainly under control on both sides thereof.

23 Claims, 3 Drawing Sheets

INFORMATION SIGNAL REPRODUCING APPARATUS HAVING A TRACKING CONTROL SYSTEM

BACKGROUND OF THE INVENTION

1. Field of the Invention:

This invention relates to an information signal reproducing apparatus and, more particularly, to an apparatus arranged to reproduce information signals from a recording medium on which many recording tracks are formed in parallel to each other.

2. Description of the Related Art:

The rotary head type magnetic video recording or reproducing apparatus using a magnetic recording tape (hereinafter referred to as VTR for short), as well known, generally has two tape speed operating modes. One is a long time recording or reproducing mode (hereinafter referred to as LP mode) and the other is a standard recording or reproducing mode (hereinafter referred to as SP mode). If the VTR of this kind is arranged to perform recording and reproduction with the same pair of rotary heads both in the LP and SP modes, there arises the so-called guard band in the case of the SP mode because the SP and LP modes give different spacing distances between recording tracks from each other as shown in FIGS. 1 and 2 of the accompanying drawings, the former showing the tracks formed by the LP mode and the latter the tracks formed by the SP mode. As a result, in the SP mode, the pair of heads are unable to pick-up pilot signals simultaneously from two tracks neighboring a track which is mainly under control (hereinafter referred to as the main track) in accordance with the known four-frequency pilot control method. Therefore, with the VTR arranged in the above-stated manner, it has been hardly possible to accurately carry out the tracking position control over the head 13 and the pattern of the track 12. The further details of this are as follows:

Referring to FIGS. 1 and 2, the illustrations include a magnetic tape 11 which is employed as a recording medium; recording tracks 12 in which signals are recorded; a head 13; and the above-stated guard band 14.

FIG. 3 shows a tracking error signal 18 obtained from pilot signals reproduced from the two neighboring tracks together with the RF output level of information signal or a pilot signal output level 17 of the information signal reproduced from the main track in relation to the deviating degree 16 of the head 13 from the center of the track. The deviating degree 16 is on the axis of abscissa and the reproduction output level 19 of the head 13 on the axis of ordinate. The tracking error signal 18 has a dead zone corresponding to the width of a guard band 14 if the tape 11 has the guard band. In other words, the error signal output becomes zero while the reproducing head 13 is within this dead zone. Under that condition, even if the level 17 of the RF output or that of the pilot signal reproduced from the main track is caused to become lower than a maximum value by the deviation of the center of the reproducing head 13 from the center of the track, no control is performed on the travel of the tape. In the event of deviation of the head 13 to a greater extent from the center of the track, no control can be accomplished until the tracking error signal 18 comes to be reproduced from the neighboring tracks. In that event, the travelling position of the tape 11 is adjusted to an inappropriate position determined by the characteristic of a tape travelling speed control system.

SUMMARY OF THE INVENTION

It is therefore a general object of this invention to provide an information signal reproducing apparatus which is capable of solving the above-stated problem.

It is a more specific object of this invention to provide an information signal reproducing apparatus which is capable of accomplishing adequate tracking control even in cases where the pitch of recording tracks is larger than the width of the reproducing head.

Under this object, an information signal reproducing apparatus arranged, according to this invention, to reproduce information signals from a recording medium on which many recording tracks are formed in parallel, comprises: a reproducing head arranged to reproduce the information signals from the recording medium; first means for generating a first control signal for tracking control on the basis of a signal reproduced by the reproducing head from one of the many tracks which is under control; second means for generating a second control signal for tracking control on the basis of signals reproduced by the reproducing head from two tracks neighboring the track under control on both sides thereof; and control means for controlling the tracking action of the reproducing head according to the first and second control signals.

It is another object of this invention to provide an information signal reproducing apparatus which is capable of adequately reproducing information signals irrespectively of the pitch of recording tracks formed on a recording medium from which the information signals are to be reproduced.

Under that object, an information signal reproducing apparatus arranged, according to this invention, to reproduce information signals from a recording medium on which many tracks are formed with a plurality of pilot signals of different frequencies recorded, one in each of the tracks, along with the information signals comprises: a reproducing head arranged to reproduce the information signals from the recording medium; first means for generating a first control signal for tracking control on the basis of a signal reproduced by the reproducing head from one of the many tracks which is under control; second means for generating a second signal for tracking control on the basis of the pilot signals reproduced by the reproducing head; and control means for controlling the tracking action of the reproducing head, said tracking control means having a first control mode in which tracking control is performed by using the first control signal and a second control mode in which tracking control is performed by using said second control signal.

These and further objects and features of this invention will become apparent from the following detailed description of a preferred embodiment thereof taken in connection with the accompanying drawings.

DETAILED DESCRIPTION OF THE PREFERRED EMBODIMENT

Figure 1:
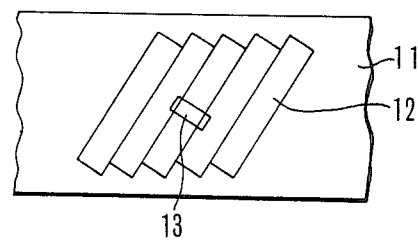
FIG. 1 is an illustration of a recording pattern formed on a magnetic tape in a long time recording or reproducing mode by the conventional VTR.
Figure 2:
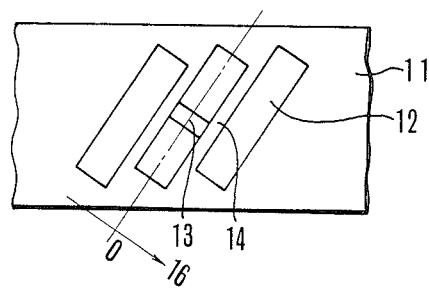
FIG. 2 is an illustration of a recording pattern formed on the magnetic tape in a standard recording or reproducing mode by the conventional VTR.
Figure 3:
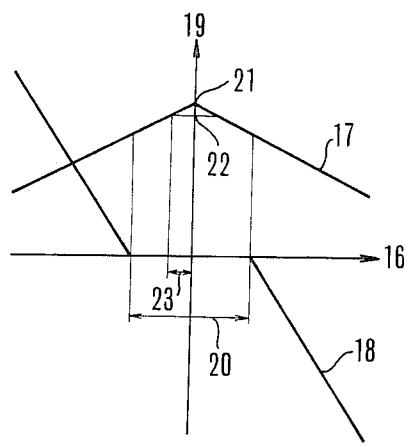
FIG. 3 is an illustration of the tracking error signal of the conventional VTR in relation to tracking errors.
Figure 4:
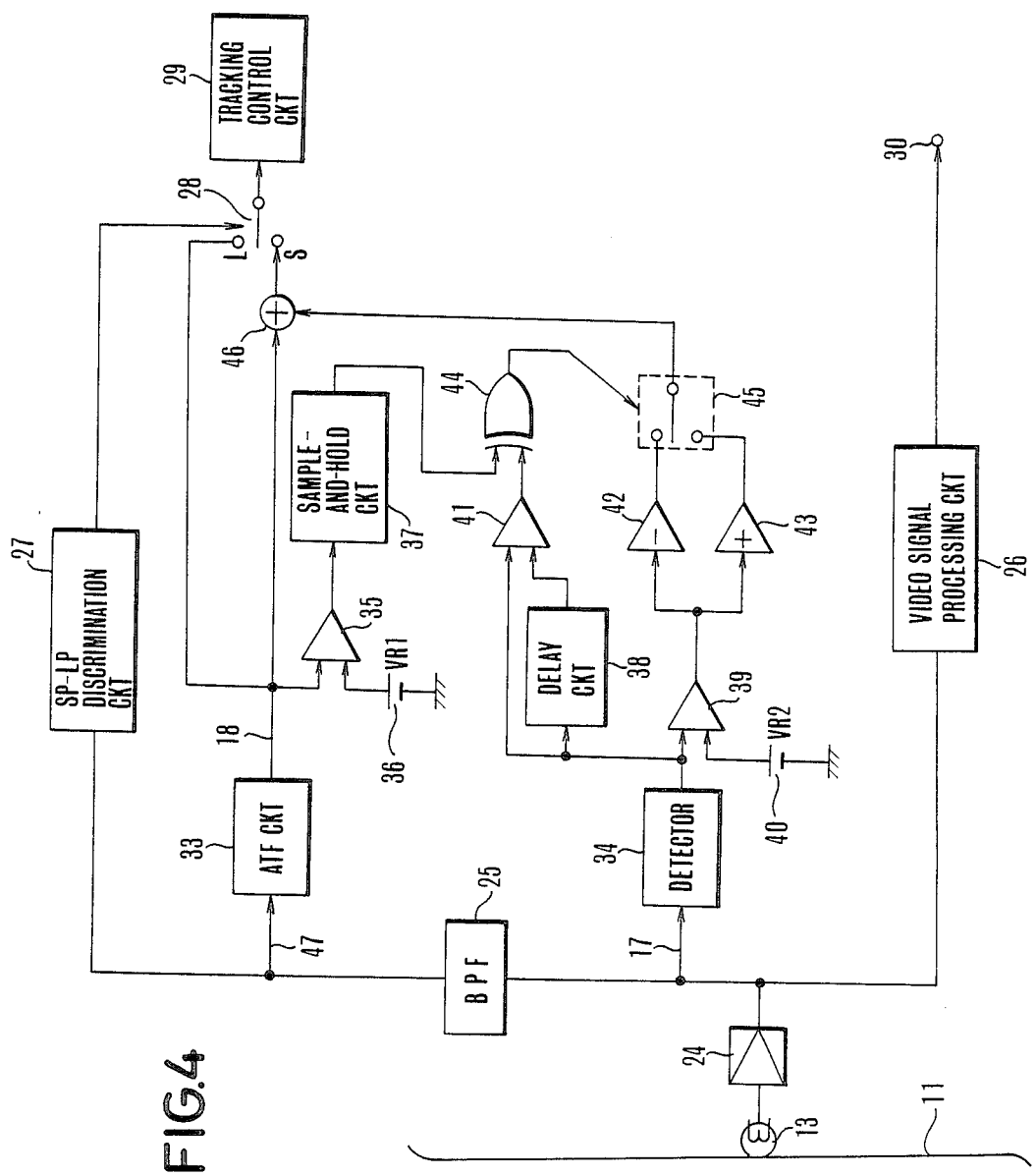
FIG. 4 is a schematic illustration showing in outline the arrangement of an embodiment of this invention.

The details of this invention will be understood from the following description of a preferred embodiment of the invention with reference to the accompanying drawings, in which: FIG. 4 shows, in outline, the arrangement of an apparatus according to this invention. In FIG. 4, the component elements which are similar to those shown in FIGS. 1 and 3 are indicated by the same reference numerals and the details of them are omitted from the following description: The illustration of FIG. 4 includes an amplifier 24 which is arranged to amplify a signal reproduced by a reproducing head 13; a bandpass filter (BPF) 25 which separates a pilot signal component from the reproduced signal; a known reproduced video signal processing circuit 26; an SP-LP discrimination circuit 27 which uses reproduced pilot signals separated by the BPF 25 and finds whether a magnetic tape under a reproducing operation has been recorded in the SP mode or in the LP mode; a switch 28; a tracking control circuit 29 which controls the positions of the reproducing head 13 and the magnetic tape 11 relative to each other; a video signal output terminal 30; a tracking error signal detecting circuit (hereinafter referred to as ATF circuit) 33 which operates according to the known four-frequency pilot method; a detector 34; a comparator 35; a reference voltage source 36 which produces a reference voltage VR1; a sample-and-hold circuit 37; a delay circuit 38; a differential amplifier 39; another reference voltage source 40 which produces another reference voltage VR2; a comparator 41; an inverting amplifier 42; a non-inverting amplifier 43; an exclusive OR gate 44; an analog switch 45; an adder 46 which has a non-linear gain characteristic; and a pilot signal 47 introduced.

In the SP reproducing mode, the embodiment performs tracking control by using the RF output of a reproduced information signal when the reproducing head 13 is within a dead zone 20. The tracking control is performed in the following manner:

First, the maximum level of the RF output signal is obtained by carrying out a test or the like. A difference between the maximum level 21 and the level of the RF output signal 17 is obtained and employed as a tracking error signal. The absolute value of the error thus can be obtained. In accordance with the conventional arrangement, however, it still remains unknown whether the error is in the direction of advancing the travelling position of the tape or in the direction of retarding it. Whereas, this embodiment is capable of detecting also the direction of the error.

In the arrangement described above, a tracking error signal 18 is obtained in accordance with the conventional four-frequency pilot method. When the head 13 is in the dead zone 20, the error signal 18 becomes "0". In actuality, the error signal 18 becomes a DC voltage Vof of a certain value. In this instance, the reference voltage VR1 of the voltage source 36 is assumed to be equal to the VOLTAGE Vof of the DC component of the signal 18. When the error signal 18 and the reference voltage VR1 are supplied to the comparator 35, the output of the comparator 35 becomes one of signals of two kinds according to the phase relation between the head 13 and the tape 11. In other words, the output of the comparator 35 thus shows whether the position of the tape 11 is to be advanced or to be retarded relative to the tape 13. However, when the head 13 is within the dead zone 20, it is unknown which of the two signals is obtained. Besides, the signal might be affected to a great degree by a noise. Therefore, when the difference between the error signal 18 and the reference voltage VR1 becomes smaller than a certain given value, the sample-and-hold circuit 37 holds the output of the comparator 35. This arrangement permits detection of a state of the signal obtained immediately before the head 13 enters the dead zone 20. The output of the sample-and-hold circuit 37 is supplied to the exclusive OR gate 44.

Meanwhile, the RF output signal 17 is subjected to level detection at the detector 34 and is then supplied to the differential amplifier 39, the comparator 41 and a delay circuit 38. At the comparator 41, the detected level of the RF output signal and the detected level which is obtained by delaying it for a given period of time by the delay circuit 38 are compared with each other. The result of this comparison shows whether the level of the present RF output signal has risen or dropped from that of the RF output signal obtained the given period of time before (corresponding to the delay time). Further, the detection voltage is also supplied to the differential amplifier 39. In this instance, the reference voltage VR2 of the voltage source 40 is set at a voltage equal to the maximum value 21 of the RF output signal.

Figure 5:
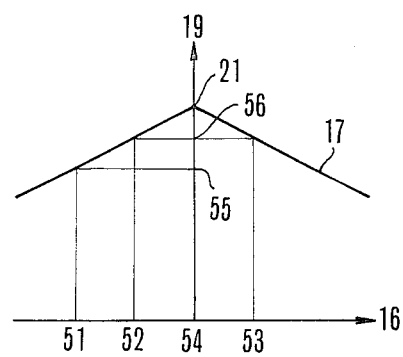
FIG. 5 is an illustration of the operation of the apparatus of FIG. 4.

Referring to FIG. 5, the further details of the above are as follows: In FIG. 5, lines 51, 52, 53 and 54 respectively show the deviated positions of the center of the head from the centers of tracks. Numerals 55 and 56 denote the levels of the RF output signal. Assuming that the head 13 is first located in the position 51, the RF output signal and the maximum output level 51 is then obtained at the level 55. The difference between the RF output signal is then obtained at the level 55. The difference between the RF output signal level 55 and the maximum output level 21 is amplified by the differential amplifier 39. Meanwhile, the output of the sample-and-hold circuit 37 and that of the comparator 41 are supplied to the exclusive OR gate 44. By this, the direction in which the tracking control is to be performed is detected.

The level of the RF output signal increases in both cases where the head 13 shifts from the position 51 to another position 52 and where it shifts from the position 51 to the position 53. In both cases, therefore, the exclusive OR gate 44 produces the same signal. If the signal from the gate 44 is used as it is for controlling the switch 45, the connecting position of the analog switch 45 becomes the same in both of these cases. As a result, the output of the differential amplifier 39 is amplified either by the inverting amplifier 42 or by the non-inverting amplifier 43. Then, the output of the amplifier 42 or 43 is added to the error signal 18 at the adder 46. Accordingly, the tape 11 is controlled in one and the same direction irrespective as to whether the head 13 is shifted from the position 51 to the position 52 or to the position 53. This would cause inconvenience.

To avoid such inconvenience, therefore, the embodiment is arranged as follows: The reference voltage VR2 is set at a level which is somewhat lower than the maximum RF output level 21 as shown in FIG. 3. The gains of the differential amplifier 39, the inverting amplifier 42 and the non-inverting amplifier 43 are arranged to be somewhat small in such a manner that: The relative position of the tape 11 and the head 13 is not shifted as much as in the case of the shift from the position 51 to the position 52 by one performance of the control operation and the shift of the relative position is arranged never to exceed the position 54 which corresponds to the maximum RF output. This arrangement ensures that the detected direction indicating signal, which is produced from the exclusive OR gate 44, always correctly shows the error controlling direction. Thus, in the case of the SP reproducing mode, the tracking error signal produced from the adder 46 is supplied via the switch 28 to the tracking control circuit 29. Upon receipt of this signal, the control circuit 29 drives a tracking control servo device, which is not shown, to correct the deviation of the center of the head from the center of the track being traced.

The switch 28 is arranged to have its connecting position shifted by the SP-LP discrimination circuit 27 to one side S in the case of the SP reproducing mode and to the other side L in the case of the LP reproducing mode. In the case of the LP mode, therefore, a tracking control signal obtained according to the known four-frequency method is supplied to the tracking control circuit 29. Then, the tracking control is accomplished in accordance with the conventional manner.

In the embodiment described, the reference voltage VR2 is set at a value 22 which is slightly lower than the maximum RF output 21. This causes the center of the head 13 to deviate from that of the track to an extent 23 and thus slightly lowers the RF output signal level. However, this enables the tracking control servo operation to be stably accomplished in the SP reproducing mode.

The voltage value of the reference voltage VR2, i.e. the value 22 shown in FIG. 3, can be determined by watching the picture, in the case of a VTR, and by selecting a point at which the picture quality still remains close to the picture quality obtainable with the head 13 set at the center of the track.

Further, the embodiment is arranged to ensure accurate tracking control even when the head 13 is within the dead zone 20.

Figure 6:
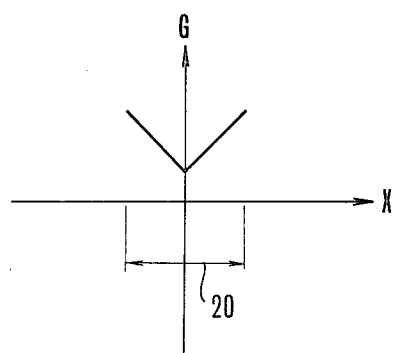
FIGS. 6 and 7 are illustrations showing the non-linear characteristic of the gain of an adder of FIG. 4 in relation to tracking errors.

FIG. 6 shows the polygonal characteristic of relation between the deviating extent X of the head 13 and a gain G of the adder 46 resulting from the non-linear gain characteristic of the adder. As shown, the gain of a signal representing the shift of the relative position of the head 13 varies even within the dead zone 20.

As mentioned in the foregoing with reference to FIGS. 4 and 5, the signal representing the deviation value X of the head 13 and the direction in which the head 13 is to be shifted relative to the track is obtained according to the RF output 17 through the inverting amplifier 42, the non-inverting amplifier 43, the exclusive OR gate 44 and the analog switch 45. In response to this signal, the adder 46, the gain of which is determined according to the non-linear characteristic shown in FIG. 6, adds the output of the analog switch 45 together with the tracking error signal 18 coming from the ATF circuit 33. A tracking control signal is thus obtained for reproduction in the SP mode. With the tracking control accomplished according to this tracking control signal, the head 13 can be accurately positioned relative to the pattern of the track 12 irrespective as to whether the head is within or without the dead zone 20.

Figure 7:
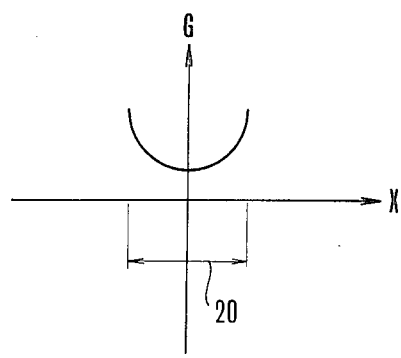

Further, the non-linear gain characteristic of the adder 46 does not have to be as shown in FIG. 6 but may be arranged to be of an exponential functions shown in FIG. 7. In short, the gain characteristic may be arranged in any manner as long as it is of such a function that the gain G increases, accordingly as the head 13 deviates further from the center of the track 12.

What is claimed is:

1. An information signal reproducing apparatus for reproducing information signals from a recording medium on which many recording tracks are formed in parallel to each other, comprising:
    (a) a reproducing head arranged to reproduce said information signals from said recording medium;
    (b) first means for generating a first control signal for tracking control on the basis of a signal reproduced by said reproducing head from a first track which is one of said many tracks;
    (c) second means for generating a second control signal for tracking control on the basis of signals reproduced by said reproducing head from a second track and a third track neighboring said first track on both sides thereof; and
    (d) control means for controlling the tracking action of said reproducing head according to said first and second control signals.

2. An apparatus according to claim 1, wherein said second means includes comparison means for comparing the reproduction levels of signals reproduced by said reproducing head respectively from said second and third tracks.

3. An apparatus according to claim 2, wherein a plurality of pilot signals of different frequencies are recorded along with said information signals, one of said pilot signals being recorded in each of said many tracks; and said second means includes separating means for sepaarating pilot signal components of said different frequencies from signals reproduced by said reproducing head.

4. An apparatus according to claim 1, wherein said first means includes means for performing an envelope detecting operation on signals reproduced by said reproducing head.

5. An apparatus according to claim 4, wherein said first means includes computing means for computing a difference between the level of a signal produced from said envelope detection means and a predetermined level.

6. An apparatus according to claim 1, wherein said tracking control means includes means for determining a polarity of said first control signal.

7. An apparatus according to claim 6, wherein said tracking control means further includes polarity control means for controlling said determining means on the basis of said second control signal.

8. An apparatus according to claim 6, wherein said tracking control means further includes adding means for adding up said first and second control signals.

9. An informatin signal reproducing apparatus for reproducing information signals from a recording medium on which many tracks are formed with a plurality of pilot signals of different frequencies recorded, one in each of said tracks, along with said information signals, comprising:
    (a) a reproducing head arranged to reproduce said information signals from said recording medium;

(b) first means for generating a first control signal for tracking control by detecting an envelope of a signal reproduced by said reproducing head from one of said many tracks;

(c) second means for generating a second control signal for tracking control on the basis of said pilot signals reproduced by said reproducing head; and (d) control means for controlling the tracking action of said reproducing head, said tracking control means having a first control mode in which tracking control is performed by using said first control signal and a second control mode in which tracking control is performed by using said second control signal.

10. An apparatus according to claim 9, wherein said tracking control means includes adding means for adding said first and second control signals together; and said tracking control means performs tracking control on the basis of a signal produced from said adding means in said first control mode.

11. An apparatus according to claim 10, wherein said tracking control means further includes means for selectively producing either said second control signal or the signal produced by said adding means.

12. An apparatus according to claim 9, further comprising change-over means for changing the control mode of said tracking control means between said first and second control modes.

13. An apparatus according to claim 12, wherein said change-over means includes means for discriminating whether or not a spacing distance between said many tracks is wider than the head width of said reproducing head.

14. An apparatus according to claim 13, wherein said discriminating means makes said discrimination by using said pilot signals reproduced by said reproducing head.

15. An information signal reproducing apparatus for reproducing information signals from a recording medium on which many tracks are formed with a plurality of pilot signals of different frequencies recorded, one in each of said tracks, along with said information signals, comprising:

(a) a reproducing head arranged to reproduce said information signals from said recording medium;

(b) control signal generating means for generating a control signal for tracking control on the basis of a signal reproduced by said reproducing head from a first track which is one of said many tracks;

(c) polarity control means for controlling a polarity of said control signal by using said pilot signals reproduced by said reproducing head; and (d) tracking control means for controlling a tracking action of said reproducing head on the basis of said control signal the polarity of which is controlled by said polarity control means.

16. An apparatus according to claim 15, wherein said control signal generating means includes means for performing an envelope detecting operation on the signals reproduced by said reproducing head.

17. An apparatus according to claim 16, wherein said control signal generating means further includes means for computing a difference between a level of an output signal of said envelope detecting means and a predetermined level.

18. An apparatus according to claim 17, wherein said control signal generating means further includes means for imparting a non-linear gain characteristic to an output signal of said computing means.

19. An apparatus according to claim 15, wherein said polarity control means includes comparison means for comparing reproduced levels of signals reproduced, respectively, by said reproducing head from a second track and a third track neighboring said first track on both sides thereof among said many tracks.

20. An apparatus accoridng to claim 19, wherein said polarity control means further includes means for sampling and holding a signal relative to an output signal of said comparison means.

21. An apparatus according to claim 19, wherein said polarity control means further includes means for discriminating between increasing and decreasing tendencies of a level of said control signal.

22. An information signal reproducing apparatus for reproducing information signals from a recording medium on which many tracks are formed with a plurality of pilot signals of different frequencies recorded, one in each of said tracks, along with said information signals, comprising:

(a) a reproducing head arranged to reproduce said information signals from said recoiding medium;

(b) first means for generating a first control signal on the basis of a signal reproduced by said reproducing head from one of said many tracks;

(c) second means for generating a second control signal on the basis of said pilot signals reproduced by said reproducing head;

(d) addition means for performing an adding operation on said first and second control signals with a non-linear characteristic; and (e) tracking control means for controlling the tracking action of said reproducing head on the basis of an output signal of said addition means.

23. An information signal reproducing apparatus for reproducing information signals from a recording medium on which many recording tracks are formed in parallel to each other, comprising:

(a) a reproducing head arranged to reproduce said information signals from said recording medium;

(b) control signal generating means for generating a control signal for tracking control on the basis of a signal reproduced by said reproducing head from one of said many tracks;

(c) means for imparting a non-linear gain characteristic to said control signal; and (d) tracking control means for controlling the tracking action of said reproducing head on the basis of said control signal after said non-linear gain characteristic is imparted to said control signal.

* * * * *